Aug. 6, 1929.    G. C. WORRELL    1,723,639
MACHINE TOOL
Filed Dec. 23, 1927    3 Sheets-Sheet 1
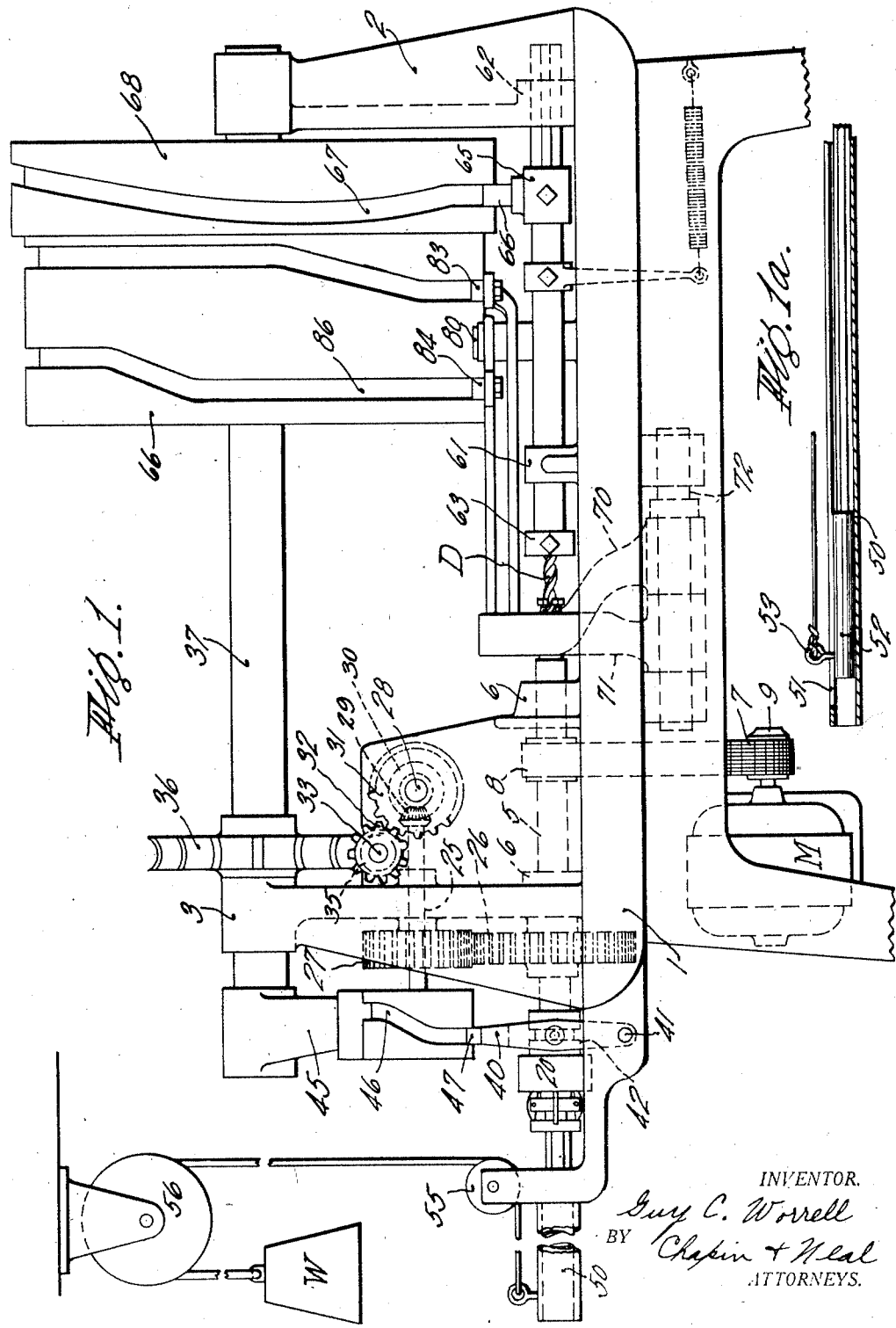
INVENTOR.
Guy C. Worrell
BY Chapin + Neal
ATTORNEYS.

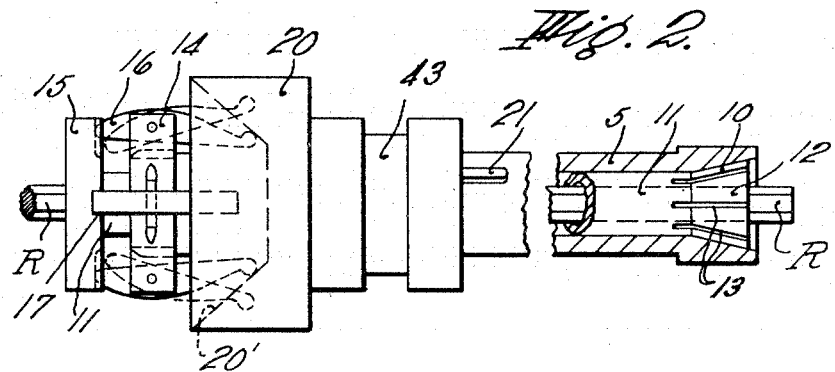
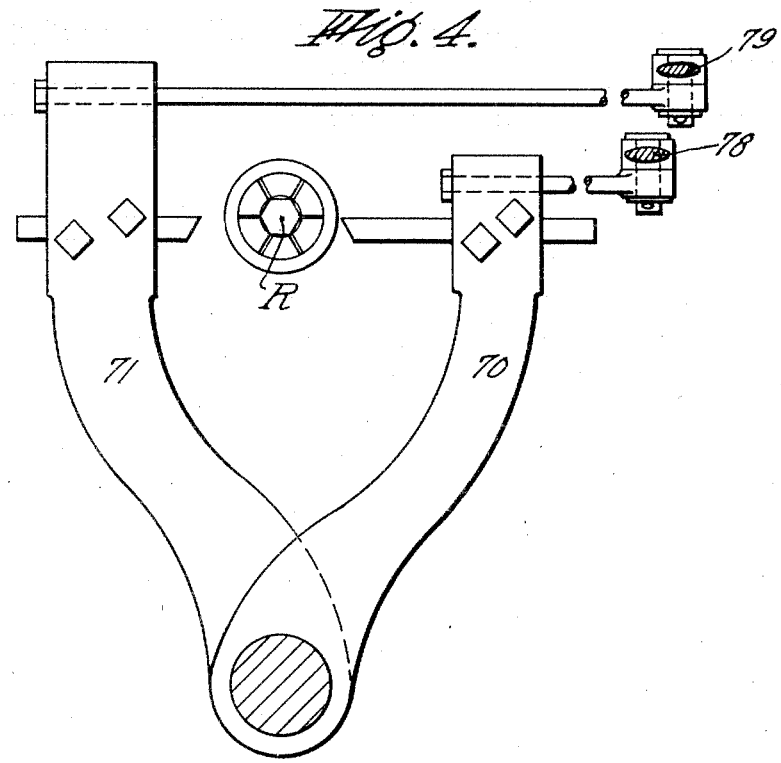

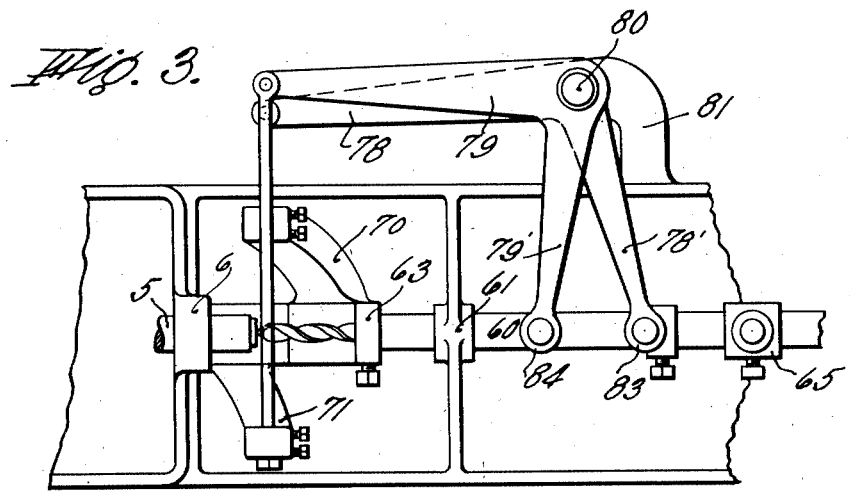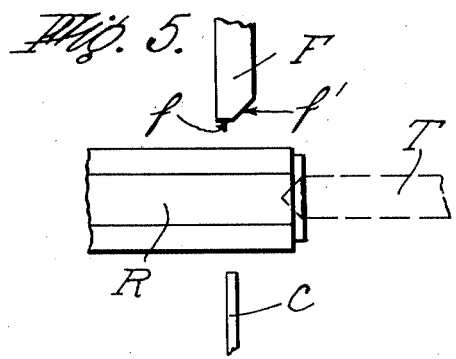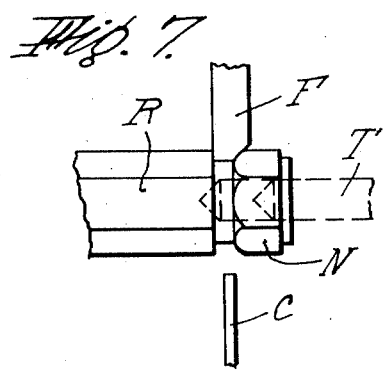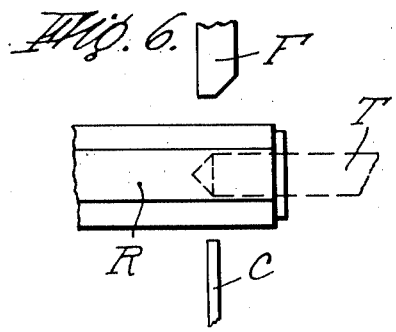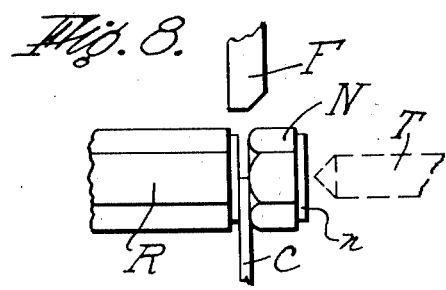

Patented Aug. 6, 1929.

1,723,639

UNITED STATES PATENT OFFICE.

GUY C. WORRELL, OF WESTFIELD, MASSACHUSETTS, ASSIGNOR TO WESTFIELD NUT COMPANY, OF WESTFIELD, MASSACHUSETTS, A CORPORATION OF MASSACHUSETTS.

MACHINE TOOL.

Application filed December 23, 1927. Serial No. 242,154.

This invention relates to improvements in machine tools and more particularly to apparatus for forming nut blanks or the like from rods of material.

The apparatus of my invention is adapted for broad application wherever it is desired to form objects from a bar or rod but will, for purposes of disclosure, be described in connection with the forming of nut blanks from a bar of material.

It is usual in connection with similar apparatus of the prior art to feed the bar of material forwardly against a stop which is withdrawn to permit the end of the bar to be worked upon by tools of some sort. Especially where nut blanks are made, the stop swings into the path of or in front of the bar to locate the bar and then swings out of the path so that a drill or other tool may advance towards and into the end of the bar so that the time consumed by the movement in and out of the stop naturally slows up the production of the machine. According to one novel feature of my invention, I utilize the drill as a stop so that as the bar is fed thereagainst for positioning it, the drill may be immediately thereafter fed into the work and thereby eliminate a dwell of the drill formerly necessary for withdrawal of the stop.

As a further feature of the invention, I provide novel means for feeding the bar forwardly against the drill and for clamping and rotating the bar for a machining operation.

Many other novel features and their advantages will be observed from the following description of the invention which is illustrated in the form at present preferred by means of the accompanying drawings, in which:

Fig. 1 is a side elevational view of a machine which embodies the novel features of the invention;

Fig. 1ª is a sectional elevational view of the bar support and feeding means;

Fig. 2 is a longitudinal view partly in section of the main spindle and collet of the machine shown in bar clamping position;

Fig. 3 is a plan view of the tool carrying arms and operating levers;

Fig. 4 is an elevational view of the tool carrying arms; and

Figs. 5 to 8, inclusive, are diagrammatic views showing various positions of the tools, and showing how they act upon the end of the bar of material to form the nut blanks.

Referring to the drawings in detail, 1 represents a frame or bed for supporting the various parts of the apparatus which has forward and rear upwardly extending bearing members 2 and 3 and which may be fixed to and supported by legs 4 as shown; or, if desired, the bed may be supported by a bench, table or the like.

A hollow spindle or tube-like shaft 5 is suitably journalled in bearings 6 of the support 3 and serves as a driving shaft for the machine by being driven from a motor M by means of a chain 7 and sprocket wheels 8 and 9.

Obviously the spindle may be geared to the motor or driven from any other suitable source of power by a belt or other driving connections. The spindle 5 (see Fig. 2) is provided on its forward end with a tapering socket or opening 10 and carries a hollow tube-like collet 11 which has a forward flaring head portion 12, the taper of which preferably corresponds to that of the socket 10. The portion 12 of the collet is provided with suitable slots 13, as shown, so as to provide yieldable jaws which function as a chuck so that a bar of material R carried by the collet may be firmly clamped or embraced or clamped by the jaws when the jaws are moved towards one another as they are drawn into the socket 10.

Flanges 14 and 15 are fixed to the ends of spindle 5 and collet 11 respectively by any suitable means such as keys, screw threads or the like so as to be rigid therewith. Levers 16 pivoted in the flange 14 are arranged to swing between the full line position and the dotted line position shown in Fig. 2. They have cam surfaces or end portions for engaging the flange 15 and are adapted to force the flange 15 outwardly with respect to the flange 14 so as to move the collet and draw the head end portion 12 of the collet into the socket 10 of the spindle for clamping the bar R. In effect, these levers operate as wedge members movable in and out between the flanges 14 and 15 to produce a relative movement of the spindle and collet.

Radial slots 17 provided in the face of the flange 15 are arranged to receive the ends of the levers 16 so that as the levers are swung to engage the flange 15 the ends of the levers will fall into the slots 17 and lock the flanges against relative rotation whereby the collet will be rotated by the spindle 5 so as to rotate the rod R.

A lever actuating collar 20 slidable along the spindle 5 but held against rotation with respect thereto by any suitable means (such as a key 21) has a tapering socket 20' for receiving and acting on the levers 16. This collar is slidable to the right from the position shown so as to release the levers 16 and allow them to swing so that their ends do not bear on the flange 15 and leave the slots thereof. When thus disengaged, the collet is free to move forwardly of the spindle so that the jaws of the collet will release the bar and permit it to be fed forwardly of the spindle.

A jack shaft 25 preferably parallel with and disposed above the spindle is suitably journalled for rotation in the member 3 and is driven from the spindle 5 by means of inter-meshing gears 26 and 27. A transverse shaft 28 is driven from the shaft 25 by means of a bevel pinion 29 and gear 30 and has fixed thereto a gear 31 which meshes with a gear 32 of a worm shaft 33. A worm 35 fixed to shaft 33 meshes with a worm wheel 36 which is fixed to a cam shaft 37 journalled as shown.

By means of the gearing shown or by means of any other similar arrangement desired, the cam shaft is driven from the spindle 5 and it is desirable that the shaft 37 be rotated at a comparatively slow speed with respect to the spindle 5.

A lever 40 for shifting the collar 20 is pivoted as at 41 and has separated side portions which lie at opposite sides of the collar 20 while rolls 42 rotatable on said arms are arranged to ride in a circumferential groove 43 of said collar 20. A cam member 45 fixed to the shaft 37 is provided with a cam groove 46 which is arranged to receive a roll or stud 47 on the upper end of the lever 40 so that as the cam member 45 rotates the cam groove thereof will engage the lever 40 and swing it back and forth so as to move the collar 20 back and forth along the spindle to thereby move the levers 16 and lock and unlock the collet and spindle.

In practice, the cam will be formed and timed to cause the collet to clamp and rotate the rod during the operation of various cutting tools and will release the rod at the proper time to permit a forward feeding movement thereof so that the forward end of the bar will be presented to the cutting tools.

The rod R is fed forwardly by means of the following. A rod supporting tube 50 extending rearwardly of the machine, as shown in Fig. 1ª, is provided with a longitudinal slot 51 along the upper side thereof and a feed plunger 52 slidable therein is provided with an arm or extension 53 which extends outwardly therefrom and through said slot 51. The plunger is urged forwardly of said tube by means of a weight W connected thereto by a flexible cable 54 or the like which is supported by suitable guide pulleys 55 and 56. When a rod is inserted in the tube ahead of the plunger, the weight is preferably arranged to urge the rod along the tube so that when its end is released by the jaws of the collet it will be moved against the drill D which acts as a stop to position the rod with respect to the tools as will later appear.

A drill spindle 60 slidable but non-rotatable in suitable bearings 61 and 62 carries on its inner end a tool holding device such as a chuck 63 of ordinary form. In this case a chuck for gripping the shank of a drill is shown although for various tools various gripping devices may be employed.

A collar 65, adjustably fixed to the spindle 60, carries a roll or stud 66 which rides in a groove 67 of a cam member 68 fixed to the shaft 37 so that as the said shaft rotates, the cam will move the spindle in one direction or the other in proper timed relation. The groove of the cam and the arrangement of the parts will preferably be timed and arranged so that the point of the drill is located in a position to act as a stop for the end of the rod as it is released by the collet and fed forwardly by the feed mechanism. After the feeding movement, the cam will (as shown in Fig. 6) move the spindle and drill so that the non-rotating drill will enter the rod which is gripped and rotated by the spindle and collet.

Other tools for acting on the rod and operating means therefor will now be described with particular reference to Figs. 1, 3, and 4 to 8, inclusive.

Tool levers 70 and 71 are arranged to oscillate on a rock shaft 72 carried by the bed and carry adjacent their upper ends cutting tools F and C. These tools may take any form desired but in connection with the embodiment of the invention shown may be called a forming tool F and a cutting-off tool C, the former being shaped and arranged to perform a certain forming operation while the latter is arranged to cut off the previously drilled and formed end portion of the rod to produce the nut blank.

The levers 70 and 71 are arranged to swing in and out so as to carry the tools into and out of engagement with the work or rod R and receive their swinging motion by means of operating levers 78 and 79 which are pivoted at 80 to a bracket 81 of the frame, as shown in Fig. 3. Inwardly extending arms 78' and 79' of the levers 78 and 79 carry cam rollers 83 and 84 which ride in cam grooves 85 and 86 of the cam 66.

With particular reference to Figs. 7 and 8, it will be seen that the forming tool F has angularly disposed cutting edges $f$ and $f'$ so that as the swinging lever 70 carries the tool into engagement with the rotating rod R, the rod is grooved and the upper or rear side of the nut blank N is bevelled or chamfered in the well known manner. As the cutting tool C is in turn swung into engagement with the rod or bar (as illustrated in Fig. 8), its forward end severs the nut blank from the rod. It is desirable that the cutting tool have a cutting edge of less width than the groove made by the former F so that as the cutter severs the blank from the forward end of the rod a washer flange or seat $n$ will be left on the end of the rod, as shown. By varying the size of the cutters and their arrangement, the washer seats may be made of various thicknesses as may be desired.

The arrangement of the cam grooves and the parts operated thereby may be varied within wide limits by those skilled in the art so that the machine may be adapted for various purposes; but for the purpose of producing the drilled nut blanks described, the operation of the machine will be described as follows.

The drill D is adjusted in the chuck 63 so that when the spindle 60 is moved forwardly by the cam, its point will be positioned so as to act as a stop for the end of the bar or rod R and locate its end at the desired point. With the drill thus located to act as a stop, the cam 45 operates to release the levers 16 so that the collet will release the bar, the spindle 5 of course being rotated. With the bar thus released, the feed mechanism will urge or feed the rod or bar of material forwardly until its end brings up against the point of the drill. The collar 20 is then moved rearwardly by the cam and lever so as to act on the levers 16 to lock the spindle and collet together whereby the rod is clamped by the collet and rotated by said collet and spindle. As the spindle and collet thus rotate to rotate the rod or bar, the drill spindle is fed forwardly by the cam 45 so that the drill enters the end of the rod to produce a thread hole for the nut blank.

As the drill approaches the forward limit of its movement, which is controlled by the arrangement of the cam, the forming tool F is swung inwardly so that its forward cutting edge engages the rotating bar and forms the groove therein and at the same time bevels the corners of the nut blank. According to the timing and arrangement of the parts, the drill may be retracted during the operation of the forming tool.

As the forming tool finishes its work and is swung away from the rod, the cutting tool C is swung inwardly so that its forward cutting edge enters the groove in the bar and severs the nut blank from the end of the rod. As before stated, the arrangement of the parts and their operation may be varied to adapt the machine for various purposes, the particular adaption described in connection with producing nut blanks from a bar or rod being merely for purposes of disclosure.

If desired, the drill may be replaced by a combined drilling and threading tool and the relative speeds of the operating parts may be modified or changed so that a blank may be threaded as well as formed and cut off from the bar.

From the foregoing, it will be observed that I have provided an apparatus which is simple in construction and which is efficient in operation to the end that its output is increased over similar machines of the prior art.

It will be also noted that by utilizing the drill as a stop for the bar material I am able to effect a saving of time in each cycle of operation of the machine; and that by engaging or gripping the bar at a point adjacent the cutting tools I am not only able to provide a simple means for feeding the bar forwardly as well as firmly support the bar against pressure applied thereto in directions opposed to its axis of rotation.

I am aware that many changes may be made in the form of the invention to adapt it for various uses and I prefer to be limited, if at all, by the appended claims rather than by the foregoing description.

What I desire to secure by Letters Patent is:

1. A machine of the class described comprising in combination, a non-reciprocable work spindle for guiding a bar of work in forward feeding movements thereof so that an end of a bar may be presented at the inner forward end of said spindle, a reciprocable tool spindle having a forward inner end spaced from the inner end of said work spindle, a combined stop and tool on the inner end of said tool shaft and disposed in alignment with the axis of said work spindle so that its forward end may act as the sole stop for a bar of work fed forwardly of said work spindle, the said tool shaft being reciprocable in a path which is parallel to the axis of the work spindle from a rear stop position forwardly towards said work spindle and vice versa whereby the stop-tool may enter the end of a bar of work presented by said work spindle.

2. A machine of the class described comprising in combination, a non-reciprocable work spindle for guiding a bar of work in forward feeding movements so as to present an end of a bar at the inner forward end of said spindle, clutching mechanism on said spindle for gripping and releasing a bar of work, mechanism for feeding a bar forwardly of said spindle, a tool spindle, reciprocable in axial alignment with said work spindle, a stop in the form of a drill carried by the inner end of said tool spindle disposed in axial alignment with said work spindle and in the path of movement of a bar of work and adapted as work is fed forwardly to act as the sole stop therefor, the said tool spindle being reciprocable forwardly from a stop position towards said work spindle and vice versa whereby the tool may enter and withdraw from said work.

3. A machine of the class described comprising in combination, a rotatable work spindle for guiding a bar of work for forward feeding movements thereof to present an end of a bar at the inner forward end thereof, chuck mechanism for clutching a bar of work to said spindle or releasing the same to permit a feeding movement thereof, bar feeding mechanism, a tool spindle in axial alignment with said work spindle and reciprocable with respect thereto having its inner end spaced therefrom, a stop in the form of a drill on the inner end of said tool spindle which is disposed in axial alignment with said work spindle so as to present its forward end in the path of movement of a forwardly fed bar, the said tool shaft being reciprocable forwardly from a stop position towards said work spindle and vice versa whereby said tool in contact with a bar may enter the end of said bar immediately as it commences a forward movement from its bar stopping position, a pair of separate tool arms pivoted for independent swinging movements on axes disposed below and parallel to that of said spindles which are provided with tool carrying portions disposed at opposite sides of the axis of said spindles, mechanism for reciprocating said tool spindle and for swinging said arms.

In testimony whereof I have affixed my signature.

GUY C. WORRELL.